US008573531B2

(12) United States Patent
Cazals et al.

(10) Patent No.: US 8,573,531 B2
(45) Date of Patent: Nov. 5, 2013

(54) AIRPLANE WITH REAR ENGINES

(75) Inventors: Olivier Cazals, Daux (FR); Alexis Manneville, Toulouse (FR)

(73) Assignee: Airbus Operations SAS, Toulouse (FR)

(*) Notice: Subject to any disclaimer, the term of this patent is extended or adjusted under 35 U.S.C. 154(b) by 1114 days.

(21) Appl. No.: 12/473,338

(22) Filed: May 28, 2009

(65) Prior Publication Data
US 2010/0038472 A1 Feb. 18, 2010

(30) Foreign Application Priority Data

May 30, 2008 (FR) ...................................... 08 53591

(51) Int. Cl.
B64D 27/00 (2006.01)

(52) U.S. Cl.
USPC .......................................................... 244/54

(58) Field of Classification Search
USPC ........... 244/54, 53 B, 55, 129.1, 129.4, 129.5
See application file for complete search history.

(56) References Cited

U.S. PATENT DOCUMENTS

| 3,085,770 | A | * | 4/1963 | Sutton | 244/23 B |
| 3,592,415 | A | * | 7/1971 | Walley et al. | 244/55 |
| 4,500,055 | A | * | 2/1985 | Krojer | 244/55 |
| 4,549,708 | A | * | 10/1985 | Norris | 244/129.4 |
| 5,046,689 | A | * | 9/1991 | Shine | 244/129.4 |
| 5,350,136 | A | * | 9/1994 | Prosser et al. | 244/129.4 |
| 5,443,229 | A | | 8/1995 | O'Brien et al. | |
| 6,516,606 | B2 | * | 2/2003 | Fournier et al. | 60/262 |
| 6,966,524 | B2 | * | 11/2005 | Stuhr | 244/53 B |
| 7,255,307 | B2 | * | 8/2007 | Mayes | 244/129.5 |
| 2005/0056726 | A1 | * | 3/2005 | Mayes | 244/54 |
| 2010/0096495 | A1 | * | 4/2010 | Lecordix et al. | 244/54 |

FOREIGN PATENT DOCUMENTS

| DE | 19 24 459 A1 | 11/1969 |
| DE | 20 16 805 A1 | 10/1970 |
| FR | 1 271 797 A | 9/1961 |
| FR | 1 314 597 A | 1/1963 |
| FR | 1 443 200 A | 6/1966 |

* cited by examiner

Primary Examiner — Rob Swiatek
Assistant Examiner — Valentina Xavier
(74) Attorney, Agent, or Firm — Ingrassia Fisher & Lorenz P.C.

(57) ABSTRACT

An aircraft has at least two jet-propulsion engines mounted laterally on the fuselage in a symmetrical design in the aft part of the fuselage. Each jet engine is mounted on the fuselage some distance from the vertical plane of symmetry of the aircraft, so that the jet engine, in a so-called half-buried configuration, is partly inside an envelope surface of a theoretical fuselage. The half-buried, jet engines are mounted on a main boom fitted on the vertical plane of symmetry of the aircraft, inside the fuselage in back, of a forward main frame. The tail sections are mounted on the main boom and the boom is integral with structures for transmitting forces into the forward part of the fuselage. The structure is advantageously made of fiber-reinforced composite materials.

12 Claims, 4 Drawing Sheets

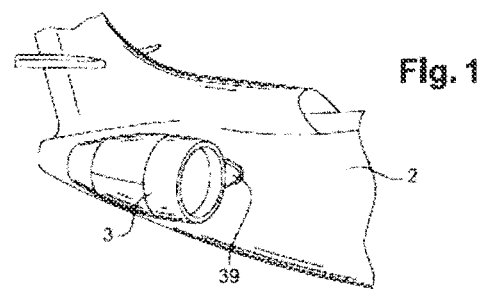
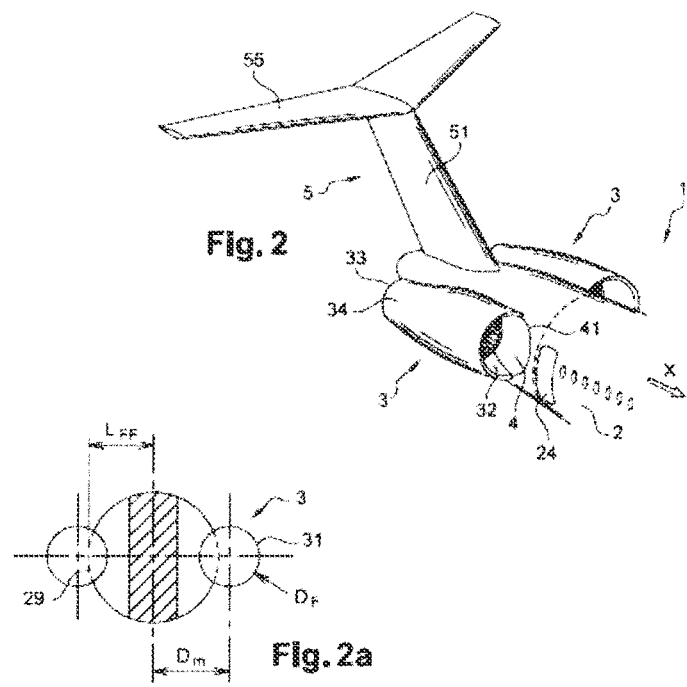

AIRPLANE WITH REAR ENGINES

CROSS-REFERENCE TO RELATED APPLICATIONS

This application claims priority to and the benefit of French Application No. 08 53591 filed on 30 May 2008, the disclosure of which is incorporated herein by reference in its entirety.

BACKGROUND

1. Field

This invention is in the field of jet-propelled aircraft, such as civil transport planes.

More specifically, the invention concerns an aircraft with at least two jet engines mounted on the aft part of the fuselage.

2. Brief Description of Related Developments

Modern transport planes, particularly civil passenger transport planes, use various configurations for the installation of propulsion systems.

Jet engines, particularly dual-flow jet engines, are the type of engine most used today because of their performance in terms of thrust and specific consumption and their ability to cruise at high speeds, particularly around Mach 0.8, which are considered to meet current civil transport requirements.

On current modern airplanes, the jet engines are most often either mounted under the wing or on the aft part of the fuselage, a configuration called aft-mounted engines, as illustrated in FIG. 1.

In the known way, in an aft-mounted engine configuration, two engines 3 are mounted symmetrically on either side of the vertical plane of symmetry of the aircraft, laterally on the fuselage 2 by means of support structures, engine struts 39.

Such a configuration, an illustration of which is given in U.S. Pat. No. 2,863,620, is used in twin-engine planes, such as the Caravelle SE210 from Sud Aviation or, in a more recent embodiment, such as the CRJ900 from Bombadier.

Some airplanes propelled by more than two jet engines, also have, in addition to jet engines mounted laterally on the fuselage, a third jet engine fitted above or in the fuselage, approximately in the plane of symmetry of the airplane and in the aft part of the fuselage.

In the known configurations of aft-mounted engines on either side of the fuselage, the engines are kept a certain distance from the walls of the fuselage by engine struts, and each engine is provided with a pod in an approximately orbital shape.

These aft engine installation configurations, while functional, have proven relatively heavy and structurally prejudicial, do not appear optimal in terms of aerodynamic drag and are hard to adapt to modern jet engines with high bypass ratios that are heavy, voluminous and require high rigidity for mounting.

Moreover, the development of non-metallic structures for fuselages, particularly structures made of composite materials, makes it more complicated to use the known solutions for aft-mounted jet engines on the fuselage.

SUMMARY

To solve these different problems, the subject matter described herein proposes an airplane whose aft jet engines, two aft jet engines supplemented, if need be, by jet engines located in other places, approximately symmetrical in design in relation to the vertical plane of symmetry of the airplane, are installed on the sides of the fuselage partly buried in the airplane fuselage.

To do so, each of the two so-called half-buried jet engines is mounted on the fuselage at a distance from the vertical airplane plane of symmetry in such a way that the jet engine is in the part inside the envelope surface of a theoretical fuselage, whose lines correspond approximately to the lines of a fuselage with the same general dimensions without aft jet engines or with aft jet engines mounted in the conventional way outside on the fuselage with supporting struts.

In this configuration, the semi-buried jet engines are preferably mounted to a main boom, fitted on the vertical plane of symmetry of the airplane, inside the fuselage behind a main forward frame; this unit has the advantage of a relatively simple structural design that can be made of composite materials with no major difficulty.

Due to its position half-buried in the fuselage, in order to ensure a satisfactory air flow upstream from the jet engines, each half-buried jet engine is provided, in front of an air inlet, with a guidance area for the aerodynamic flow of the air inlet; the guidance area is located inside the envelope surface of the theoretical fuselage, and the main forward frame is provided with an undercut relief for the passage of said guidance area.

In one design, preferred for its structural simplicity and the absence of aerodynamic stress inside the fuselage, each half-buried jet engine is mounted to a support strut, which is mounted on the main boom.

To maintain mobile cowlings on the engine pods, the supports mounted on the main boom are advantageously in the form of articulated supports for the pod cowlings.

To mount and remove the jet engines by gravity, hooked supports, mounted or detachable are advantageously mounted on the main boom to attach to it means of hoisting the jet engines during maintenance operations.

Because of the envelope shapes of the pod cowlings of each half-buried jet engine, at least in the case of an aft or so-called core cowling, located near a jet engine exhaust nozzle, and to permit opening without interference with the jet engine, the core cowling has a first element articulated on articulated supports mounted on the main boom and at least one second element articulated on the first element.

When the jet engine pod cowlings need not be opened completely, like for example a front cowling, called the air inlet cowling, located in the air inlet area of the jet engine, the air inlet cowling has at least one moving part, articulated or detachable that basically corresponds to the cowling or to a secondary element of the cowling to allow passage of the front fan cone of the jet engine when the engine is raised or lowered vertically during a maintenance operation.

To take advantage of the reinforced structure of the main boom in the aft part of the fuselage, the vertical part of one unit of the tail section of the aircraft is mounted on the main boom.

To transmit forces to the fuselage, the main boom is preferably integral with the upper and/or lower and/or lateral structures transmitting forces from the main boom into the areas of the fuselage in front of the main forward frame.

To make repair or service operations easier, the main boom is mounted on the main forward frame so it is removable and reinforced, if need be.

Advantageously, the structures transmitting the lateral forces are fitted in the guidance areas to guide the aerodynamic flow of the air inlets and extend forward, at least in part, into a pressurized area of the fuselage, which laterally delineates a manageable volume of the fuselage with a smaller width than the width permitted by the theoretical fuselage.

Preferably, the structural elements are made basically with composite materials, such as carbon-fiber-reinforced materials.

DESCRIPTION OF THE DRAWINGS

The aircraft with aft-mounted jet engines in the invention is described with reference to the figures, which show schematically:

FIG. 1: already cited, a perspective view of an aft part of an aft-mounted jet engine mounted on the fuselage, on engine struts according to the prior art;

FIG. 2: a perspective view of an aft part of a plane with aft-mounted engines mounted on the fuselage according to the invention;

FIG. 2a: a simplified view of a section of the fuselage and the aft engines illustrating the envelope section of the theoretical fuselage;

DESCRIPTION OF THE EMBODIMENTS

Figure 3A:
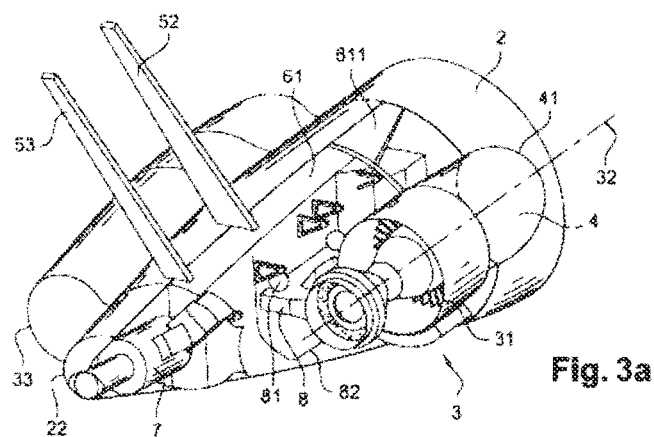
FIG. 3a: a partial cutaway view of the aft part of the aircraft in FIG. 2.

An aircraft 1, in which only the aft part is shown in FIG. 2, according to the invention, has a fuselage 2 on which are mounted two engines 3 and tail sections 5, basically a vertical rudder 51 and a horizontal tail section 55.

The description of the invention will designate "forward" and "aft" as the direction toward the front of the aircraft in the direction of movement in flight, shown by an arrow illustrating a positive axis X of an airplane mark in FIG. 2 and the direction toward the rear in the direction opposite the direction of movement in flight, respectively.

The directions when used also refer to the conventional directions in an airplane reference system. In particular, the aircraft has a general vertical plane of symmetry.

The aft jet engines 3 are mounted on the fuselage 2 in an approximately symmetrical pattern in relation to the vertical plane of symmetry of the aircraft and oriented, in the known way, so that the thrust resulting from each jet engine is oriented approximately toward the front of the aircraft 1, to ensure propulsion, at least in part.

The detailed description of the installation of the jet engines is given only for one aft engine, since the principles described can easily be applied to the second aft engine, which, if need be, is in a not strictly symmetrical position, for example, offset along the direction of the X axis for safety reasons in the event of an engine explosion or for reasons of aeroelastic coupling.

In the aircraft 1, an aft jet engine 3 is mounted on the fuselage 2 some distance from the vertical plane of symmetry of the aircraft, so that said engine is partly inside an envelope surface of a theoretical fuselage 29, shown on the diagram in FIG. 2a, in which the lines correspond to the lines of the fuselage in form, section and length in particular, near the fuselage 2 of the aircraft 1, but which would have no aft engines or would have aft engines mounted in the conventional way to support struts, as in the example in FIG. 1.

This configuration proper to the invention is generically called half-buried jet engines.

If Lff is the half-width of the theoretical fuselage 29 in terms of the position of a reference diameter Df of the engine 3, reference diameter Df defined as the diameter of a revolving part 31 with a greater diameter, for example the main fan in the case illustrated of a dual flow engine, the aft engine 3 is considered partly inside the fuselage 2 when the distance Dm from an engine axis 32 to the vertical plane of symmetry is less than Lff+Df/2.

For example, the distance Dm is chosen between Lff+Df/3, which corresponds to a jet engine in which one third of the radius at the reference diameter Df is inside the theoretical fuselage, and Lff, which corresponds to an engine in which half the diameter is inside the theoretical fuselage.

The value Dm=Lff is considered in practice as approximately a minimum value of Dm because of problems with the aerodynamic configuration of the air inlet of the jet engine.

To ensure the correct supply of air to the jet engine 3, the fuselage 2 has, in front of one air inlet 32 of the engine, a guidance area 4 for the exterior aerodynamic flow along the fuselage 2.

The guidance area 4 corresponds approximately to the lower part on the theoretical fuselage of an extension of an approximately cylindrical air inlet duct, cylinder not shown, of the jet engine 3; the air inlet duct diverges slightly toward the front in relation to the vertical plane of symmetry, and, if need be, of a curved axis to limit the length of said guidance area.

This configuration in the air inlet area 32 makes it possible to guide the aerodynamic flow necessary to supply the engine 3 with air in flight.

In an embodiment not shown, the guidance area 4 has a leading edge 41 in front of said area outside the surface of the fuselage and leaves space available between the surface of the fuselage 2 and the surface of the guidance area 4, the space that forms a boundary layer bleed to improve the homogeneity of a velocity field of the aerodynamic flow in an air input plane of the jet engine.

The air circulating in flight in said available space is used, for example, to provide ventilation for an interior area of the fuselage 2 in the aft section.

At one output nozzle 33 of the jet engine 3, due to the small diameter of the jet engine 3 and a likewise small, conically shaped section of the fuselage 2 at an aft point, said nozzle is in practice outside the fuselage without it being necessary to design an unconventional guidance area for jet from the engine.

Such a design for an aft jet engine 3 mounted half-buried in the fuselage 2 has advantages in terms of the acoustic radiation of the air input 32 and the aerodynamic drag of the engine envelope pod due to the fact that the jet engine is partly inside the fuselage.

Such a design also has many advantages in terms of the structures for mounting jet engines and the installation of engine-related systems, as will emerge from the description, which presents an architecture with an aft aircraft 1 fuselage 2 structure suitable for half-buried jet engines.

Figure 4:
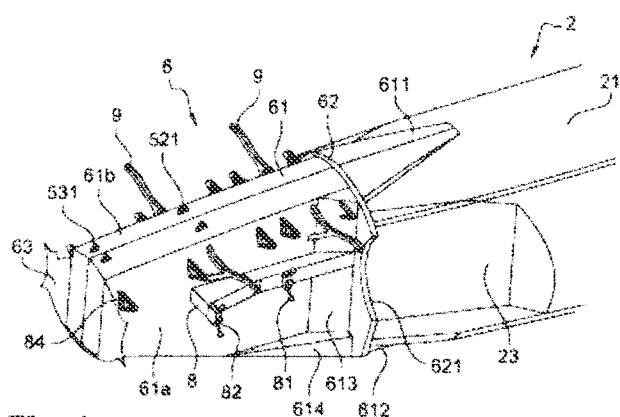
FIG. 4: a partial cutaway perspective view of the aft part of the aircraft in FIG. 2, the engine and the systems now shown.

FIG. 4 shows an example of an aft structure 6 of the fuselage 2 without the jet engines, without equipment and without secondary structures, such as the cowlings of the jet engines and the fuselage coverings.

The aft structure 6 basically includes a main boom 61 that extends along the X axis between a main forward frame 62 and a main aft frame 63.

The main boom 61, approximately symmetrical in relation to the vertical plane of symmetry of the aircraft, is advantageously a box structure that can be metal, but has the advantage of being able to be adapted to composite materials, which are increasingly being used in the aeronautics field because of the weight gains expected from using these materials.

As can be clearly seen from the drawings, particularly FIGS. 2a and 3a, the main boom 61 is located inside the fuselage not only in the longitudinal direction along the X axis, with said boom extending between the main forward frame 62 and the aft frame 63 of the fuselage, but also in the direction of the width, with the boom being bound by its lateral extension in relation to the vertical plane of symmetry of the aircraft due to the fact that the jet engines are partly inside the fuselage.

The main boom 61, an element of the fuselage 2, is limited in its vertical extension by the envelope surface of said fuselage with which it blends advantageously to take advantage of the maximum structural inertia in that direction, as shown in the figures.

In another embodiment, not shown, the vertical extension of the main boom 61 is limited to the interior of said envelope surface of the fuselage 2 on the top and/or bottom part, notably to solve aircraft system-installation problems.

In one preferred embodiment, the main boom 61 is made into two juxtaposed parts, two lateral juxtaposed booms 61a, 61b, which form a redundant, so-called "failsafe" structure that is particularly important because of the proximity of the engines.

The longitudinal extension of the boom 61 in direction X preferably corresponds at least to that of the jet engines 3.

Figure 3B:
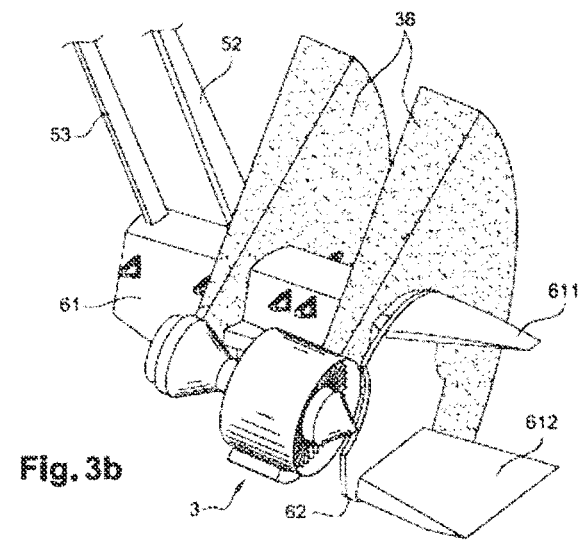
FIG. 3b: a perspective view of the main structure of the aft fuselage illustrating the cones for projecting debris in the event of an engine explosion.

In this case, each jet engine unit is located behind the main forward boom 62 and the main boom 61 is advantageously designed to form, as illustrated in FIG. 3b, a shielding area limiting the risks of damage from a jet engine due to symmetrical engine debris projected in volumes 38, so-called debris cones, in the event of an explosion of said symmetrical jet engine.

The relative positions in the direction of the X axis of the volumes 38 associated with the jet engines and basic system or structural elements, such as the spars 52, 53 of the vertical tail section 51, installed aft of the main forward frame 62 are advantageously chosen to prevent basic elements from being capable of being damaged by debris projected from the jet engines. The choice of such relative positions is greatly facilitated by degrees of freedom left by the architecture of the aft structure around the main boom 61, whose spar is easily adapted during the design stage to meet safety criteria.

The forward main frame 62 advantageously corresponds to a sealed aft frame in a pressurized area 21 of the fuselage 2 and the aft main frame 63 which closes the box structure of the main boom 61 is advantageously used to mount equipment in an aft terminal area 22, for example an auxiliary power unit 7, as illustrated in FIG. 3a.

The main boom 61 centered on the vertical plane of symmetry of the fuselage has fittings 521, 531 for mounting the vertical tail section 51, advantageously near the spars 52, 53 of said vertical tail section, to which the horizontal tail section 55 is attached in a so-called T configuration to prevent problems of integration in the area of the jet engines, i.e., near the apex of the vertical tail section, as illustrated in FIG. 2, or in a so-called mid-height cruciform configuration, a case not shown.

The main boom 61 thus takes all of the forces introduced into the fuselage 2 in the aft part of said fuselage.

To transmit the forces concentrated in the boom to the fuselage in front of the forward main frame 62, upper 611 and lower 612 structural connecting elements formed by extensions of the boom 61 structure on an upper/lower box wall of said boom, extend in front of the forward main frame 62.

These structural connecting elements 611, 612 are sections that gradually decrease toward the front as the forces are transmitted to the general structure of the fuselage on the frames, stiffeners and skins, not shown, in front of the main forward frame 62.

Intermediate reinforcing structures 613, 614 are advantageously fitted between the boom 61, the forward main frame 62 and the structural connecting elements 611, 612.

In the preferred embodiment shown in the figures, the guidance area 4 for the air input flow is basically in front of the main forward frame 62.

The configuration of the fuselage 2 at and in front of the main forward frame 62 is consequently adapted and has, on one hand, an undercut relief 621 in the main forward frame 62 whose form releases in said forward frame at least the volume delimited by the guidance area 4 and, on the other hand, has a lateral structure 23 that determines in the fuselage 2 in front of the main forward frame 62 a volume that includes elements forming the guidance area 4.

The lateral structure 23 reinforces the lateral connection between the boom 61 and the part of the fuselage in front of the main forward frame 62 and, in the example described, which has a pressurized area 21 of the fuselage in front of the main forward frame 62, is created by one or more sealed partitions that insulate the pressurized volume 21 from the elements forming the guidance area 4.

The engine 3 is mounted laterally on the main boom 61 by means of a support strut 8.

In one embodiment, the support strut 8 is similar, on the structural level and without the aerodynamic stresses, to a strut for mounting an engine under the wing of an airplane.

The support strut 8 is integral on the side of the plane of symmetry of the aircraft of the main boom 61 and on the opposite site, said main boom has trunnions 81, 82 to which the engine 3 is mounted with anchor plates.

On the main boom side 61 and the engine side 3, the mounts are the conventional type, particularly calling for so-called "fail safe" assemblies that ensure the transmission of different forces and torques, preferably under isostatic conditions. Examples of such assemblies are known, especially for mounting an engine under an airplane wing.

Besides the absence of aerodynamic stress, the support strut 8 in the invention proves simpler to make on an industrial level due to the fact that the equipment that must be installed preferably near the engine, for example tanks 81 for extinguishing products in the event of an engine fire, and all of the lines, for fuel, hydraulic . . . , and electric power and control wiring need not be installed inside the support strut 8 and have a relatively large amount of space for their installation compared to the space inside a conventional strut or a conventional jet engine pod.

Other supports are also integral with the main boom 61 or other structures of the fuselage 2 in front of the main forward frame 62.

Fixed supports 84, adapted in number, have means of articulation, such as ball joints and are designed to mount the upper edges of moving parts 341, 342, 343 of the pod 34 of the jet engine 3.

The moving parts of the pod 34 are necessary for the current maintenance operations and the operations for mounting and removing the jet engine can be done easily.

Figure 5A:
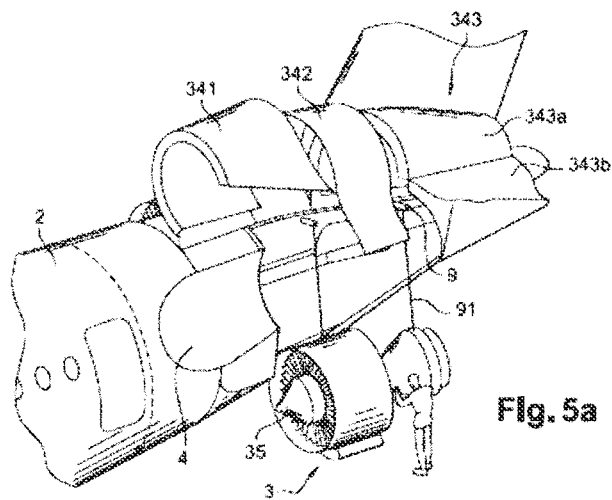
FIG. 5a: a perspective view of the aft part of the fuselage showing an example of the engine cowlings being opened during an engine maintenance operation.

Advantageously, as illustrated in FIG. 5a, the moving parts have at least one air input cowling 341 forward, one so-called core cowling 343 aft and one so-called fan cowling in the middle 342.

Making the pod 34 in several parts, as illustrated, is not an absolute requirement and meets an operational need, for example, to access certain areas of the engine without opening a single large cowling.

Simultaneously opening all of the cowlings 342, 343 and, if need be, cowling 341, as illustrated in FIG. 5a, when the engine has parts, such as a fan cone 35, projecting to the front, is necessary to perform operations to mount and remove the engine.

To perform such mounting and removal operations without complicated tools, the cowlings are made so that the space located perpendicular to the engine is entirely released when the cowlings are opened.

This condition necessitates that certain cowling elements be articulated in two or more elements, notably when the cowling in question is enveloping, that is, when the rotation around the upper edge does not make it possible to release the cowling without interference with the jet engine without modifying the geometry of said cowling.

Such a situation appears a priori with the core cowling 343 due to the fact that in the area near the engine output nozzle 33, the engine is no longer buried in the fuselage 2 or not very much. In this preferable case, the core cowling 343 has a main cowling 343a articulated on its upper edge and has at least one lower cowling 343b articulated on the main cowling 343a.

Opening the lower cowling 343b beforehand makes it possible to free the envelope part, and open the core cowling 343 without interfering by rotating the main cowling 343a on the upper articulation of said main cowling.

Advantageously, the removal and mounting operations are done by gravity, as illustrated in FIG. 5a, with hoisting means 91 mounted on support beams 9 themselves mounted on the structure of the main boom 61.

In one embodiment, the support beams 9 are mounted permanently to the main boom 61. In another embodiment, the support beams are set up and mounted on the main boom 61 only to perform maintenance operations and prevent the transport of an unnecessary mass.

Figure 5B:
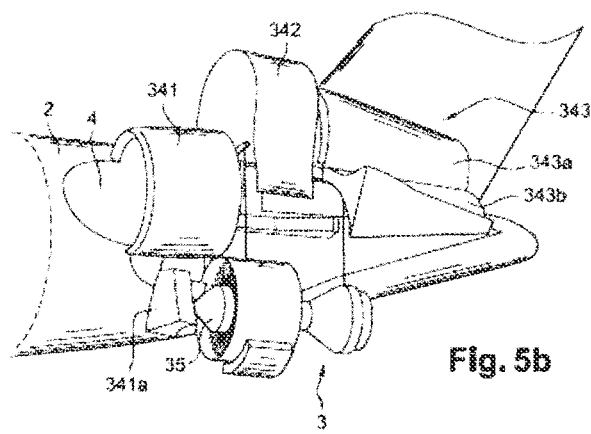
FIG. 5b: a perspective view of the aft part of the fuselage showing another example of the engine cowlings in the open position for an engine maintenance operation.

In a close embodiment of the moving cowlings on the pod, shown in FIG. 5b, the air inlet cowling 341 is made fixed and has a mobile hatch 341a, articulated or detachable, in its lower part whose dimensions are adapted for the passage of a front fan cone 35 when the engine is removed or mounted by gravity. The front cone 35, although projecting into the air inlet, has dimensions so that the mobile hatch is reduced and makes it possible to keep an air inlet cowling 341 permanent in its largest part, which need not be open to access the jet engine 3.

In the example of embodiment of the invention described and illustrated, the lateral structure 23 in front of the main forward frame 62 occupies a volume of the fuselage that, in a conventional aircraft, is a pressurized area devoted most often to cabin accommodations.

The presence of lateral structures 23 on each side of the fuselage 2 in the aft part of the cabin 21 has the effect, on one hand, of limiting the usable width to arrange this back part of the cabin and, on the other hand, limiting the possibilities for designing lateral openings in the walls of the fuselage in the extending area in the direction of the X axis of said lateral structures.

Figure 6:
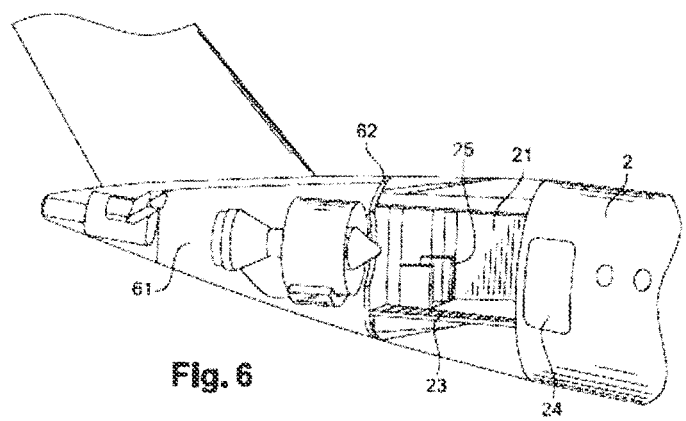
FIG. 6: a perspective cutaway view of the aft part of the fuselage showing an example of the layout of the forward cabin of the sealed aft frame.

In the case of a passenger transport airplane, it is then advantageous to devote the space available between the two lateral structures 23 to making functional spaces, such as kitchens or bathrooms, as illustrated in FIG. 6, in which the fuselage is presented in partial cutaway and the lateral structure 23 is shown only by a projection on the cabin floor, for which the absence of portholes and the proximity of the engines as noise sources are not critical.

Advantageously, doors 24 are placed on the sides of the fuselage 2 just in front of the lateral structures 23. A spar frame, not shown, preferably takes the forces caused by the presence of openings in the exits 24 and by the lateral structures 23.

In one special embodiment, the main boom 61 is assembled on the fuselage 2 in back of the main forward frame 62 by means of fasteners that can be taken off during maintenance procedures. In this embodiment, the whole part of the fuselage 2 in back of the main forward frame 62 can be taken off for replacement, inspection or service operations.

In this special embodiment, the main forward frame 62 is made according to structural principles that make sure it has the proper resistance and stability compatible with disassembly and reassembly operations on structural elements in back of said main forward frame.

The use of such structural principles, known by designers of aeronautic structures, is not very prejudicial to the structural weight since the main forward frame 62 is, on a structural level, dimensioned by different cases of loads, particularly linked to in-flight forces and cabin pressurization 21 and the aft structure proves not very stressful to remove because of the simple forms that can be made using the invention.

In one special embodiment of the invention, not shown, an aircraft 1 having half-buried engines 3 also has engines under the wings according to a conventional design.

The aircraft with aft jet engines in the invention makes it possible to obtain a fuselage with a lighter, more rigid aft structure than in the case of conventional aft-engine installations that may easily be made removable, if need be.

Such a structure can be made with metal materials using conventional techniques, but it is advantageously made with composite materials, for example composite materials reinforced with carbon fibers, both for the high charged primary structural elements and for the secondary structural elements, whose requirements for use do not prejudice their application in making the invention.

The invention claimed is:

1. An aircraft comprising:
at least two jet-propulsion engines mounted laterally to a fuselage of the aircraft in an approximately symmetrical design in relation to a vertical plane of symmetry of the aircraft in an aft area of the fuselage,
wherein each of the at least two jet engines is mounted on the fuselage a distance away from the vertical plane of symmetry of the aircraft,
wherein each jet engine is partly inside an envelope surface of a theoretical fuselage, whose lines correspond approximately to the lines of a fuselage without aft engines or with aft engines mounted in the conventional way outside the fuselage with support struts,
wherein the jet engines are mounted laterally on a main boom formed by a centered box structure on the vertical plane of symmetry of the aircraft, with said box structure being inside the fuselage in back of a main forward frame of a pressurized area of said fuselage and the main boom includes a first extension that extends from the main boom and connects the main boom with an upper portion of the pressurized area of the fuselage in front of the main forward frame in a direction of movement of the aircraft in flight, upstream from the jet engines, and a second extension that extends from the main boom and connects the main boom with a lower portion of the pressurized area of the fuselage in front of the main forward frame in the direction of movement of the aircraft in flight, upstream from the jet engines.

2. The aircraft in claim 1, in which each half-buried jet engine is provided, in front, in the direction of movement of the aircraft-in flight, with an air inlet and a guidance area for an aerodynamic air inlet flow; said guidance area is located inside the envelope surface of the theoretical fuselage and in an extension of an air inlet duct of the jet engine in question.

3. The aircraft in claim 2, in which each half-buried jet engine is mounted on the main boom so that the jet engine is located aft of the main forward frame and in which the main forward frame is provided with an undercut relief for the passage of the guidance area for the aerodynamic air inlet flow.

4. The aircraft in claim 3 in which each half-buried jet engine is mounted on a support strut, with said support strut mounted on the main boom.

5. The aircraft in claim 4, in which supports are mounted on the main boom, and said supports have articulated supports for cowlings of pods of the half-buried jet engines.

6. The aircraft in claim 5 in which the pod cowlings of each half buried jet engine have at least one aft cowling, called the core cowling, located in a jet nozzle of the jet engine, and said core cowling has a first element articulated on articulated supports mounted on the main boom and at least one second element articulated on the first element.

7. The aircraft in claim 5 in which the pod cowlings on each half buried jet engine have at least one front cowling, call the air inlet cowling, located in the air inlet area of the jet engine, and said at least one air inlet cowling has at least one moving part, articulated or detachable, to allow the passage of a front fan cone of said jet engine when said engine is raised or lowered vertically during a maintenance operation.

8. The aircraft in claim 4 in which supports are mounted on the main boom for hooking means of hoisting semi-buried jet engines.

9. The aircraft in claim 2 in which one vertical part of a tail section unit is mounted on the main boom.

10. The aircraft in claim 2 in which the main boom is integral with at least one of an upper structure, lower structure and lateral structures for transmitting forces from the main boom into areas of the fuselage in front of the main forward frame.

11. The aircraft in claim 10 in which lateral structures for transmitting forces from the main boom into areas of the fuselage in front of the forward main frame extend toward the front, at least partly, in a pressurized area of the fuselage, for which it delineates laterally a manageable volume of said fuselage with a smaller width than the width permitted by the theoretical fuselage.

12. The aircraft of claim 1, wherein the first extension is located opposite the second extension, and the first extension and the second extension intersect the vertical plane of symmetry of the aircraft.

* * * * *